US010687207B2

(12) United States Patent
Hong et al.

(10) Patent No.: US 10,687,207 B2
(45) Date of Patent: Jun. 16, 2020

(54) METHOD FOR DATA MIGRATION AND TERMINAL

(71) Applicant: Guangdong Oppo Mobile Telecommunications Corp., Ltd., Dongguan, Guangdong (CN)

(72) Inventors: Yingyu Hong, Guangdong (CN); Tianyang Lu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/283,162

(22) Filed: Feb. 22, 2019

(65) Prior Publication Data

US 2019/0191296 A1    Jun. 20, 2019

Related U.S. Application Data (63) Continuation of application No. PCT/CN2017/092868, filed on Jul. 13, 2017.

(30) Foreign Application Priority Data

Sep. 14, 2016   (CN) .......................... 2016 1 0825998

(51) Int. Cl.
*H04W 8/20* (2009.01)
*G06F 11/14* (2006.01)
(Continued)

(52) U.S. Cl.
CPC .......... *H04W 8/20* (2013.01); *G06F 11/1446* (2013.01); *G06F 11/1458* (2013.01);
(Continued)

(58) Field of Classification Search
CPC .............................. H04W 8/20; G06F 11/1446
(Continued)

(56) References Cited

U.S. PATENT DOCUMENTS

2007/0011276 A1   1/2007   Sharma et al.
2012/0117558 A1*  5/2012   Futty ................... G06F 8/61
                                               717/176
(Continued)

FOREIGN PATENT DOCUMENTS

CN   104468499 A   3/2015
CN   104660634 A   5/2015
(Continued)

OTHER PUBLICATIONS

International search report issued in corresponding international application No. PCT/CN2017/092868 dated Oct. 18, 2017.
(Continued)

*Primary Examiner* — Chuck Huynh
(74) *Attorney, Agent, or Firm* — Young Basile Hanlon & MacFarlane, P.C.

(57) ABSTRACT

A method for data migration is provided. The method includes the following. A first terminal obtains attribute information of a second terminal by scanning a two-dimensional code of the second terminal. The first terminal determines a first application compatible with the second terminal according to the attribute information of the second terminal. The first terminal obtains a first data set by performing data backup on the first application and transmits the first data set to the second terminal. A terminal is further provided.

18 Claims, 4 Drawing Sheets

(51) Int. Cl.
     *H04M 1/725*   (2006.01)
     *H04W 4/12*    (2009.01)
     *H04W 4/20*    (2018.01)
     *H04W 8/18*    (2009.01)
(52) U.S. Cl.
     CPC ..... *G06F 11/1469* (2013.01); *H04M 1/72583* (2013.01); *H04W 4/12* (2013.01); *H04W 4/20* (2013.01); *H04W 8/183* (2013.01); *H04M 2201/20* (2013.01)
(58) Field of Classification Search
     USPC ....................................................... 455/419
     See application file for complete search history.

(56) References Cited

U.S. PATENT DOCUMENTS

| | | |
|---|---|---|
| 2014/0229592 A1 | 8/2014 | Baribault et al. |
| 2016/0062572 A1 | 3/2016 | Yang et al. |
| 2018/0190050 A1* | 7/2018 | Pinney .................. G06Q 90/00 |

FOREIGN PATENT DOCUMENTS

| | | | |
|---|---|---|---|
| CN | 105094934 A | 11/2015 | |
| CN | 105282824 A | 1/2016 | |
| CN | 105491165 A | 4/2016 | |
| CN | 106341811 A | 1/2017 | |
| EP | 2264597 A1 | 12/2010 | |

OTHER PUBLICATIONS

Extended European search report issued in corresponding European application No. 17850105.2 dated Jun. 3, 2019.

* cited by examiner

First Terminal 110          Second Terminal 120

METHOD FOR DATA MIGRATION AND TERMINAL

CROSS-REFERENCE TO RELATED APPLICATION(S)

This application is a continuation of International Application No. PCT/CN2017/092868, filed on Jul. 13, 2017, which claims priority to Chinese Patent Application No. 201610825998.8, filed on Sep. 14, 2016, the disclosures of both of which are hereby incorporated by reference in their entireties.

TECHNICAL FIELD

The present disclosure relates to the technical field of electronics, and particularly to a method for data migration and a terminal.

BACKGROUND

At present, users change mobile phones more and more frequently. However, for people in lazy habits and green hands in cellphone technologies, changing a mobile phone means everything will start from an original state, and applications for daily use, important chat records and documents, all the wireless fidelity (Wi-Fi) passwords stored, and even some usage habits in the old mobile phone will be lost. Every time the user changes the mobile phone, the user is happy for minutes and troublesome for hours. In order to solve this problem, data migration has been proposed. Data migration is adopted to perform backup on data of an old mobile phone, and then to transmit the data to a new mobile phone for data recovery, so as to achieve a purpose of changing the mobile phone.

Currently, data migration is usually configured to perform backup on all data (such as contacts, text messages, applications, etc.) of the old mobile phone, and then to transmit all data backed up to the new mobile phone for data recovery.

SUMMARY

Implementations of the present disclosure provide a method for data migration and a terminal.

According to a first aspect of the present disclosure, a method for data migration is provided. The method includes the following.

A first terminal obtains attribute information of a second terminal by scanning a two-dimensional code of the second terminal. The first terminal determines a first application compatible with the second terminal according to the attribute information of the second terminal. The first terminal obtains a first data set by performing data backup on the first application and transmits the first data set to the second terminal.

According to a second aspect of the present disclosure, a terminal is provided. The terminal includes at least one processor and a computer readable storage coupled to the at least one processor. The computer readable storage stores at least one computer executable instruction thereon, which when executed by the at least one processor, cause the at least one processor to carry out actions, including: obtaining attribute information of a second terminal by scanning a two-dimensional code of the second terminal; determining a first application compatible with the second terminal according to the attribute information of the second terminal; obtaining a first data set by performing data backup on the first application and transmitting the first data set to the second terminal.

According to a third aspect of the present disclosure, a non-transitory computer storage medium is provided. The non-transitory computer storage medium stores a computer program which, when executed by a processor, cause the processor to carry out following actions, including: obtaining attribute information of a second terminal by scanning a two-dimensional code of the second terminal; determining a first application compatible with the second terminal according to the attribute information of the second terminal; obtaining a first data set by performing data backup on the first application and transmitting the first data set to the second terminal.

These or other aspects of the present disclosure will be more concise and understandable in the description of the following implementations.

BRIEF DESCRIPTION OF DRAWINGS

To illustrate the technical solutions embodied by the implementations of the present disclosure more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Technical solutions in the implementations of the present disclosure will be described clearly and completely hereinafter with reference to the accompanying drawings in the implementations of the present disclosure for those skilled in the art to better understand the scheme of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and "third" used in the specification, the claims, and the accompanying drawings of the present disclosure are used for distinguishing between different objects rather than describing a particular order. The terms "include", "comprise", and "have" as well as variations thereof are intended to cover non-exclusive inclusion. For example, a process, method, system, product, device, or apparatus including a series of steps or units is not limited to the listed steps or units, and it can optionally include other steps or units that are not listed; alternatively, other steps or units inherent to the process, method, product, device, or apparatus can be included either.

Hereinafter, some terms of the present disclosure will be explained and interpreted to facilitate understanding by those skilled in the art.

"Terminal", also known as user equipment (UE), is a device that provides voice and/or data connectivity for a user, for example, handheld devices having wireless connection functions, in-vehicle devices, and the like. Common terminal includes, for example, mobile phones, tablets, laptops, palmtops, mobile internet devices (MID), wearable devices such as smart watches, smart bracelets, pedometers, and the like.

"Hotspot" is established by converting GPRS, 3G, 4G, or 5G signals received by a terminal into Wi-Fi signals and then sending the Wi-Fi signals out. In this way, the terminal can act as a Wi-Fi hotspot. A wireless access point function is required for a terminal to establish a hotspot.

"Data set", also known as an information set, a data collection, or an information collection, is a set composed of data.

"Thread", also known as lightweight process (LWP), is a minimum unit of program execution flow.

"Serial execution" refers to a situation where operation A and operation B are successively executed, for example, operation A is executed before operation B, or operation A is executed after operation B.

"Parallel execution" refers to a situation where operation A and operation B are executed in two threads respectively. For example, operation A is executed in a first thread while operation B is executed in a second thread, and operation A and operation B can be executed concurrently. Alternatively, one operation can be executed during execution of another operation.

"Multiple" means two or more. "And/or" describes a relationship of associated objects, and means that there may be three kinds of relationships, for example, "A and/or B" may indicate that A exists alone, A and B exist simultaneously, and B exists alone. The character "/" generally indicates that the associated objects is in an "or" relationship.

Implementations of the present disclosure will be described hereinafter with reference to the accompanying drawings.

Figure 1:
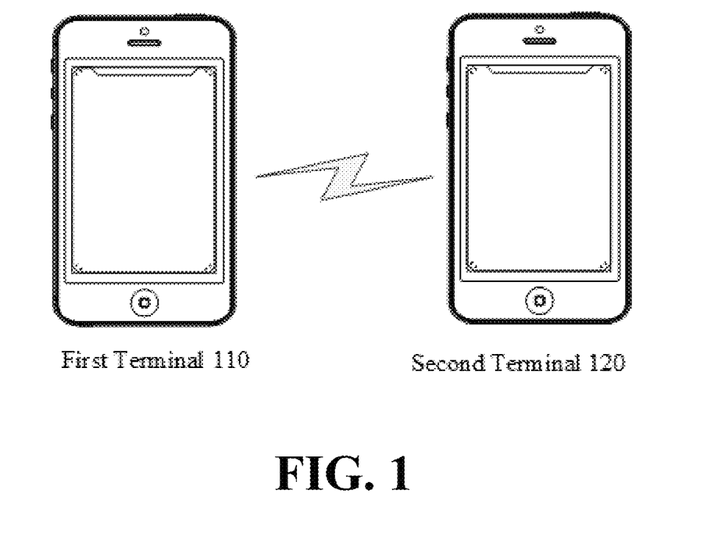
FIG. 1 is a schematic diagram illustrating a communication system provided in the present disclosure.

FIG. 1 is a schematic diagram illustrating a communication system according to an implementation of the present disclosure. The communication system illustrated in FIG. 1 includes a first terminal 110 and a second terminal 120. Data migration generally refers to performing backup on all data (such as contacts, text messages, applications, etc.) of an old mobile phone and then transmitting all data backed up to a new mobile phone for data recovery. However, when all data of the old mobile phone has been transmitted to the new mobile phone, some applications in the old terminal phone may do not work in the new mobile terminal.

In order to solve the problem, a method for data migration is provided. The first terminal 110 obtains attribute information of the second terminal 120 by scanning a two-dimensional code of the second terminal 120. The first terminal 110 then determines a first application compatible with the second terminal according to the attribute information of the second terminal 120. Finally, the first terminal 110 obtains a first data set by performing data backup on the first application and transmits the first data set to the second terminal 120.

It can be seen that, the first terminal 110 first determines the first application to be migrated according to the attribute information of the second terminal 120 before performing data backup, and the first application is compatible with the second terminal, such that the problem that some applications in the old terminal phone may be unavailable in the new mobile terminal can be avoided.

Figure 2:
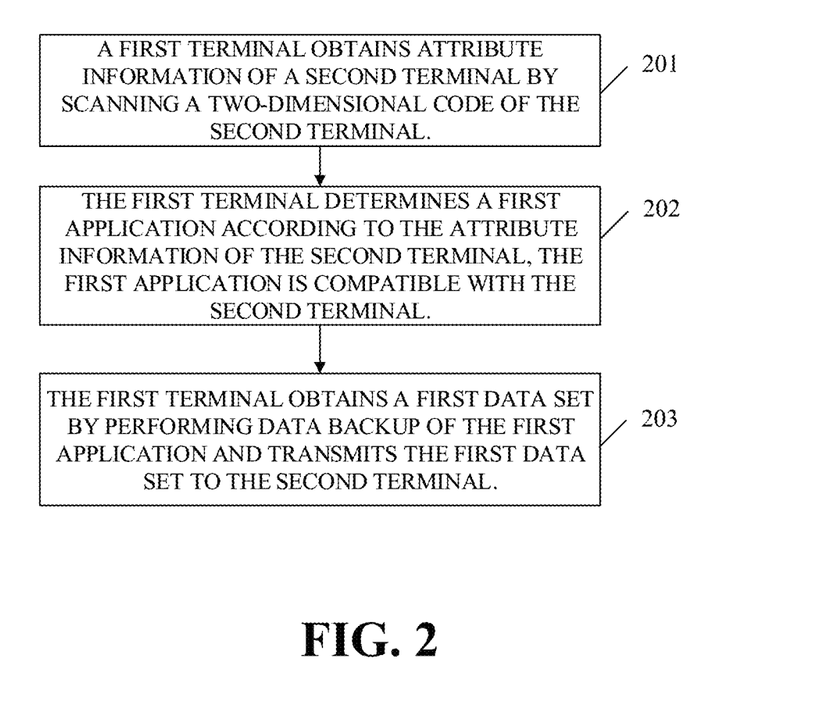
FIG. 2 is a flow chart illustrating a method for data migration according to an implementation of the present disclosure.

FIG. 2 is a flow chart illustrating a method for data migration according to an implementation of the present disclosure. The method begins with operations at block 201.

At block 201, the first terminal obtains attribute information of the second terminal by scanning the two-dimensional code of the second terminal.

As an implementation, the attribute information includes model, version information, system version information, and supported-interface information, and the like.

As an implementation, the two-dimensional code of the second terminal can be displayed on a screen of the second terminal.

At block 202, the first terminal determines the first application installed in the first terminal according to the attribute information of the second terminal, where the first application is compatible with the second terminal.

The first application is compatible with the second terminal, that is, the first application installed in the first terminal can be installed to run normally in the second terminal.

At block 203, the first terminal obtains the first data set by performing data backup on the first application and transmits the first data set to the second terminal.

According to this implementation, the first terminal first determines the first application to be migrated according to the attribute information of the second terminal before performing data backup, and the first application is compatible with the second terminal, such that the problem that some applications in the old terminal phone may be unavailable in the new mobile terminal can be avoided.

As an implementation, the first terminal prompts a message for indicating that data of a second application has not been migrated after transmitting the first data set to the second terminal. As an implementation, while prompting the message for indicating that the data of the second application has not been migrated, the first terminal performs data backup on the second application incompatible with the second terminal to obtain a second data set. After data backup of the second application is completed, the first terminal transmits the second data set of the second application to a network server.

Since the first terminal only transmits data of the first application compatible with the second terminal to the second terminal and data of the second application incompatible with the second terminal are not transmitted, the first terminal will prompt a message for indicating that the data of the second application has not been migrated after transmitting the first data set to the second terminal. The message includes at least one of voice prompt, text prompt, and vibration prompt. In addition, the first terminal performs the data backup on the second application incompatible with the second terminal to obtain the second data set. After data backup of the second application is completed, the first terminal transmits the second data set of the second application to the network server, so that the user can download data related to the second application through the network server in the future.

As an implementation, the first application is a third-party application installed in the first terminal or a system application. Similarly, the second application is a third-party application installed in the first terminal or a system application.

As an implementation, the first terminal performs data backup on the first application as follows.

If N is greater than or equal to W, the first terminal divides N first applications into M application sets and performs data backup on all first applications in an application set J in parallel, where the application set J is one of the M application sets, and N, W, and M are integers greater than one. After backup of the application set J is completed, the first terminal performs data backup on all first applications in an application set K in parallel until data backup of the M application sets is completed, where the application set K is one of the M application sets other than the application set J. If N is less than W, the first terminal performs data backup on the N first applications in parallel.

As an implementation, a relationship between the application set J and the application set K can be at least one of the following. A data size of the application set J is less than that of the application set K. A usage frequency of each first application contained in the application set J is higher than that of each first application contained in the application set K. The number of first applications contained in the application set J is smaller than the number of first applications contained in the application set K, in other words, the difference between the number of first applications contained in the application set J and the number of first applications contained in the application set K is a preset threshold. It is to be noted that the above-mentioned preset threshold can be one, two, four, five, or other values, for example.

In an implementation, the data size of the application set J is less than that of the application set K, N=10, W=5, and M=2. The first terminal divides ten first applications into a first application set and a second application set. A data size of the first application set is less than that of the second application set. The data size of the first application set refers to data size of the first applications contained in the first application set. The number of first applications contained in the first application set can be equal to that of the second application set, that is, each of the two application sets includes five first applications. The first terminal performs data backup on the five first applications in the first application set in parallel. When data backup of the five first applications in the first application set is completed, the first terminal performs data backup on the five first applications in the second application set in parallel. As another implementation, the number of first applications contained in the first application set may not be equal to that of the second application set, which is not limited here.

In an implementation, the application set J and the application set K are any of the M application sets, N=13, W=15, and M=3. The first terminal divides thirteen first applications into three application sets, that is, a first application set, a second application set, and a third application set. The number of first applications contained in each of the three application sets may be same or different. In an implementation, the first application set includes two first applications, the second application set includes four first applications, and the third application set includes seven applications. The first terminal performs data backup on the three application sets randomly. For example, the first terminal performs data backup on the four first applications in the second application set in parallel, then performs data backup on the two first applications in the first application set in parallel after data backup of the four first applications contained in the second application set is completed, and finally performs data backup on the seven first applications in the third application set in parallel after data backup of the two first applications contained in the first application set is completed.

In an implementation, the difference between the number of first applications contained in the application set J and the number of first applications contained in the application set K is the preset threshold, N=12, W=5, and M=3. The first terminal divides twelve applications into three application sets, that is, a first application set, a second application set, and a third application set. The difference in the number of first applications contained in each of two adjacent application sets is one. In an implementation, the first application set includes three first applications, the second application set includes four first applications, and the third application set includes five applications. The first terminal sequentially performs data backup on the three application sets in ascending order of the number of first applications contained in each of the three application sets. For example, the first terminal performs data backup on the three first applications in the first application set in parallel, then performs data backup on the four first applications in the second application set in parallel after data backup of the three first applications contained in the first application set is completed, and finally performs data backup on the five first applications in the third application set in parallel after data backup of the four first applications contained in the second application set is completed.

In another implementation, a usage frequency of each first application contained in the application set J is higher than that of each first application contained in the application set K, N=10, W=5, and M=2. The first terminal divides ten first applications into two application sets, and the number of first applications contained in each of the two application set is equal to each other, that is, both of the two application sets include five first applications. The usage frequency of each first application contained in the first application set is higher than that of each first application contained in the second application set. The first applications contained in the first application set includes Application A, Application B, Application C, Application D, and Application E. The first applications contained in the second application set includes Application F, Application G, Application H, Application I, and Application J. The first terminal performs data backup on the five first applications in the first application set in parallel, then performs data backup on the five first applications in the second application set in parallel after data backup of the five first applications contained in the first application set is completed.

As an implementation, the first terminal performs data backup on the first application as follows.

When N is greater than or equal to w, the first terminal performs data backup on arbitrary w first applications among N first applications in parallel, where N and w is an integer greater than one. After data backup of a first application j is completed, the first terminal performs data backup on a first application K in a thread in which backup of the first application j is performed, until data backup of the N first applications is completed, where the first application j is one of the w first applications, and the first application k is one of the N first applications other than the w first applications. When N is less than w, the first terminal performs data backup on the N first applications in parallel. As an implementation, the value of w corresponds to the number of threads that the first terminal can perform in parallel.

For example, N=10, w=4, and the first terminal performs, in four threads in parallel, data backup on arbitrary four first applications selected from ten first applications. After data backup of one of the four first applications is completed, the first terminal performs data backup on any one of the ten first applications other than the four first applications in a thread in which data backup of the foregoing one of the four first applications is performed, and so on until data backup of all the ten first applications is completed.

As an implementation, the first terminal performs data backup on the first application as follows.

When N is greater than or equal to q, the first terminal performs data backup on q first applications among N first applications in parallel, where N and q is an integer greater than one. As an implementation, the first terminal performs, in q threads in parallel, data backup on the q first applications. A usage frequency of each of the q first applications is higher than that of any one of the N first applications other than the q first applications.

After data backup of one of the q first applications is completed, the first terminal performs data backup on a first application f in a thread in which data backup of the foregoing one of the q first applications is performed, until data backup of the N first applications is completed, where the first application f is one of the N first applications other than the q first applications and a usage frequency of the first application f is higher than that of any one of N-q first applications other than the f first application.

When N is less than q, the first terminal performs data backup on the N first applications in parallel.

It is to be noted that when the number of the first applications is N, the number of the first data set is N correspondingly, and N first data sets are in one-to-one correspondence with the N first applications, then the number of the first data sets transmitted by the first terminal to the second terminal is N correspondingly. In addition, specific implementations of data backup of the first application are also applicable to perform data backup on the second application, which will not be further described herein.

Figure 3:
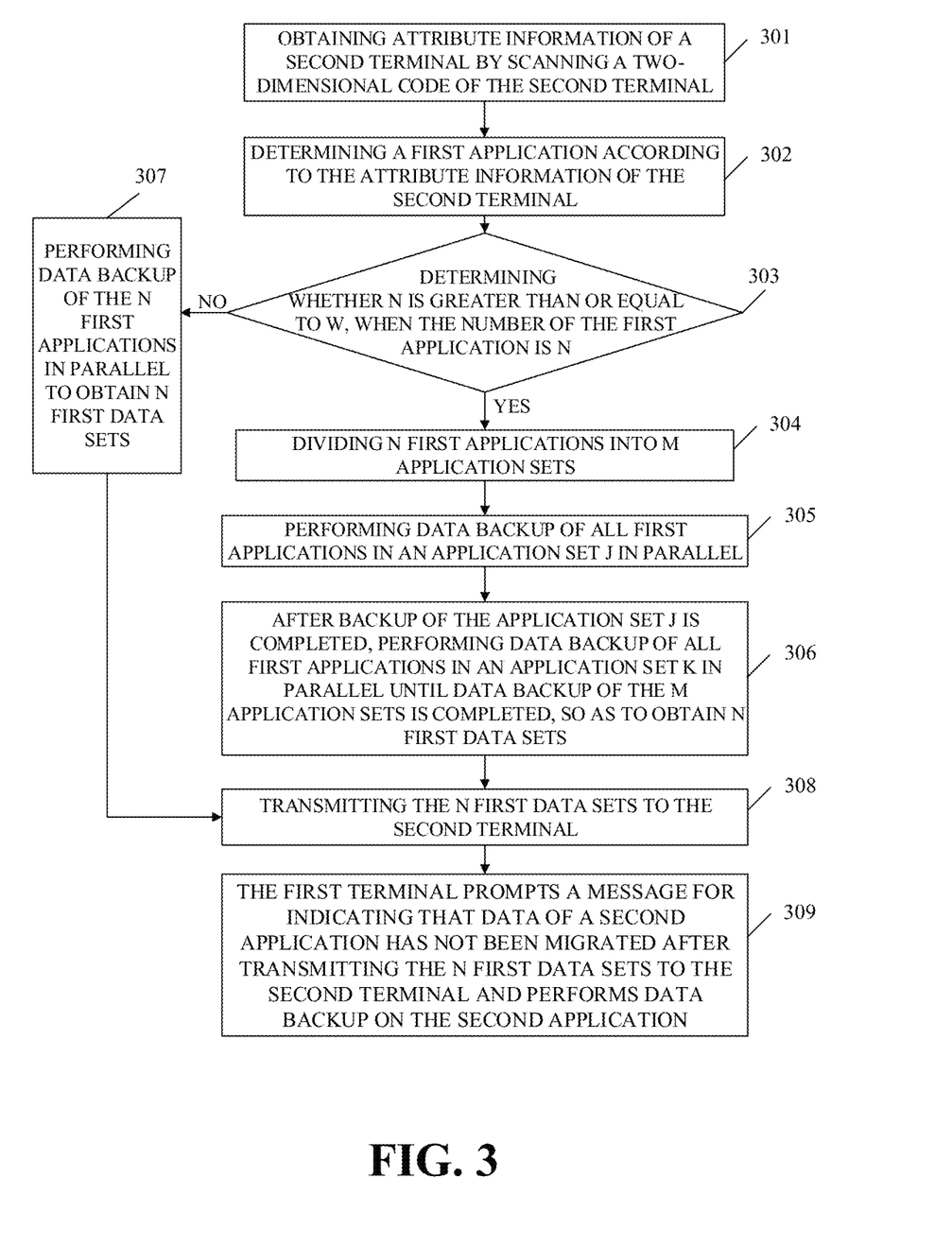
FIG. 3 is a flow chart illustrating a method for data migration according to another implementation of the present disclosure.

A more detailed method is provided. As illustrated in FIG. 3, the method begins with operations at block 301.

At block 301, a first terminal obtains attribute information of a second terminal by scanning a two-dimensional code of the second terminal.

At block 302, the first terminal determines a first application compatible with the second terminal according to the attribute information of the second terminal.

At block 303, the number of the first application is N and N is an integer greater than one, the first terminal determines whether N is greater than or equal to W.

If N is greater than or equal to W, advance to S304.
If N is less than W, advance to S307.

At block 304, the first terminal divides N first applications into M application sets.

At block 305, the first terminal performs data backup on all first applications in an application set J in parallel, where the application set J is one of the M application sets, and W and M are integers greater than one.

At block 306, after backup of the application set J is completed, the first terminal performs data backup on all first applications in an application set K in parallel until data backup of the M application sets is completed, so as to obtain N first data sets of the N first applications, where the application set K is one of the M application sets other than the application set J.

At block 307, the first terminal performs data backup on the N first applications in parallel to obtain N first data sets of the N first applications.

At block 308, the first terminal transmits the N first data sets to the second terminal.

At block 309, the first terminal prompts a message for indicating that data of a second application has not been migrated after transmitting the N first data sets to the second terminal and performs data backup on the second application incompatible with the second terminal to obtain a second data set.

It is to be noted that, for specific implementations of steps of the method illustrated in FIG. 3, reference can be made to the description of the above-mentioned methods, which is not repeated herein.

Figure 4:
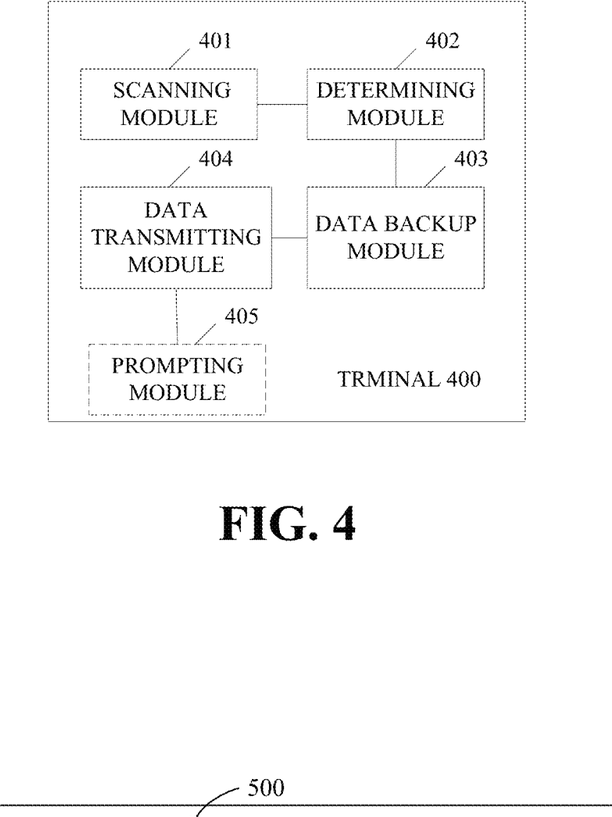
FIG. 4 is a block diagram illustrating a device for data migration according to an implementation of the present disclosure.

As illustrated in FIG. 4, a device 400 is provided. The device 400 includes a scanning module 401, a determining module 402, a data backup module 403, and a data transmitting module 404.

The scanning module 401 is configured to obtain attribute information of a second terminal by scanning a two-dimensional code of the second terminal.

The determining module 402 is configured to determine a first application compatible with the second terminal according to the attribute information of the second terminal.

The data backup module 403 is configured to obtain a first data set by performing data backup on the first application.

The data transmitting module 404 is configured to transmit the first data set to the second terminal.

As an implementation, the attribute information includes at least one of model, version information, system version information, and supported-interface information.

As an implementation, the device further includes a prompting module 405.

The prompting module 405 is configured to prompt a message for indicating that data of a second application has not been migrated after transmitting the first data set to the second terminal.

The data backup module 403 is further configured to perform data backup on the second application incompatible with the second terminal to obtain a second data set.

As an implementation, the message includes at least one of voice prompt, text prompt, and vibration prompt.

As an implementation, the data transmitting module 404 is further configured to transmit the second data set of the second application to a network server after data backup of the second application is completed.

As an implementation, the data backup module 403 is configured to perform the following.

When N is greater than or equal to W, the data backup module 403 divides N first applications into M application sets. The device 400 performs data backup on all first applications in an application set J in parallel, the application set J is one of the M application sets, and N, W, and M are integers greater than one.

After data backup of the application set J is completed, the data backup module 403 performs data backup on all first applications in an application set K in parallel until data backup of the M application sets is completed, where the application set K is one of the M application sets other than the application set J.

When N is less than W, the data backup module 403 performs data backup on the N first applications in parallel.

As an implementation, a relationship between the application set J and the application set K can be at least one of the following. A size of first applications contained in the application set J is less than that of the application set K. A usage frequency of each first application contained in the application set J is higher than that of each first application contained in the application set K.

As an implementation, and the data backup module 403 is configured to perform the following.

When N is greater than or equal to w, the data backup module 403 performs data backup on arbitrary w first applications among N first applications in parallel, where N and w is an integer greater than one.

After data backup of the first application j is completed, the data backup module 403 performs data backup on a first application k in a thread in which data backup on a first application j is performed, until data backup of the N first applications is completed, where the first application j is one of the w first applications, and the first application k is one of the N first applications other than the w first applications.

When N is less than w, the data backup module 403 performs data backup on the N first applications in parallel.

As an implementation, the first application and the second application are third-party applications installed in a terminal. Alternatively, the first application and the second application are system applications.

It is to be noted that the above-mentioned modules (the scanning module 401, the determining module 402, the data backup module 403, the data transmitting module 404, and the prompting module 405) are configured to execute corresponding operations of the above-mentioned methods.

In implementations of the present disclosure, the device 400 is presented in the form of modules. "Module" used herein may refer to an application-specific integrated circuit (ASIC), a processor and a memory that can execute one or more software or firmware programs, an integrated logic circuit, and/or other components that can achieve the above-described functions. In addition, the scanning module 401, the determining module 402, the data backup module 403, the data transmitting module 404, and the prompting module 405 can be implemented by a processor 501 of a terminal 500 illustrated in FIG. 5.

Figure 5:
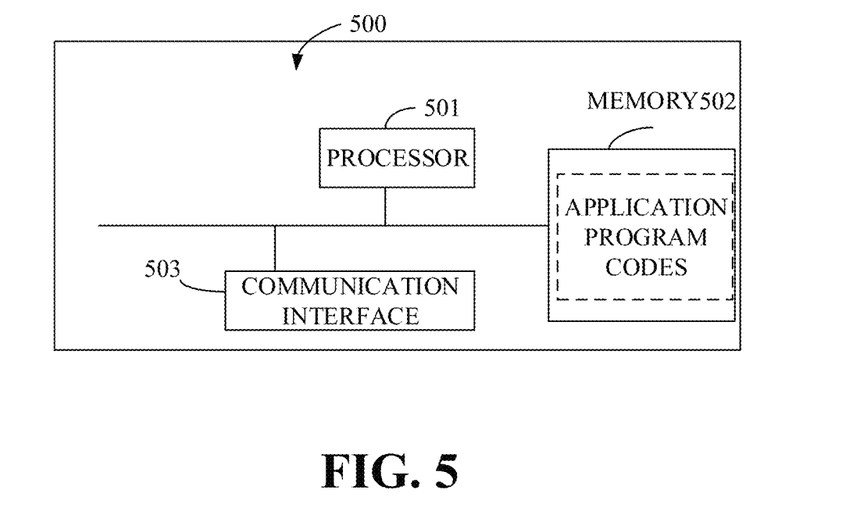
FIG. 5 is a block diagram illustrating a terminal according to another implementation of the present disclosure.

As illustrated in FIG. 5, the terminal 500 may be implemented with the structure illustrated in FIG. 5, and the terminal 500 includes at least one processor 501, at least one computer readable storage (that is memory) 502, and at least one communication interface 503. The processor 501, the memory 502, and the communication interface 503 are connected and communicated with each other through a communication bus.

The processor 501 can be a general-purpose central processing module (CPU), a microprocessor, an application-specific integrated circuit (ASIC), or one or more integrated circuits for controlling execution of programs of the above schemes.

The communication interface 503 is configured to communicate with other devices or communication networks, such as an Ethernet, a radio access network (RAN), a wireless local area network (WLAN), and the like.

The memory 502 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM) or other optical disk storage, optical disk storage (including compact discs, laser discs, optical discs, digital versatile discs, blue-ray discs, etc.), magnetic disk storage medium, other magnetic storage devices, or any other mediums that can be used to carry or store desired program codes in the form of instructions or data structures and can be accessed by a computer. The present disclosure is not limited thereto. The memory can be separated from the processor and connected to the processor via a bus. The memory can also be integrated with the processor.

The memory 502 is configured to store application program codes for executing the above schemes. The processor 501 is configured to execute the application program codes stored in the memory 502.

The application program codes stored in the memory 502 can execute the above-mentioned method for data migration performed by the above-mentioned terminal 500. For example, obtain attribute information of a second terminal by scanning a two-dimensional code of the second terminal. Determine a first application compatible with the second terminal according to the attribute information of the second terminal. Obtain a first data set by performing data backup on the first application and transmitting the first data set to the second terminal.

A more specific application scenario is given below, where the above-mentioned terminals are mobile phones, and components of the mobile phone will be described in detail with reference to FIG. 6 as follows.

An RF circuit 610 can be configured to receive and transmit signals during information transmission or reception or during a call. In some possible implementations, the RF circuit 610 is configured to receive downlink information from a base-station and passes the downlink information to a processor 680 for processing; in addition, the RF circuit 610 is configured to send uplink data to the base-station. Generally, the RF circuit 610 includes but is not limited to an antenna, at least one amplifier, a transceiver, a coupler, a low noise amplifier (LNA), a duplexer, and the like. Furthermore, the RF circuit 610 may also be configured to communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

A memory 620 is configured to store software programs and modules. The processor 680 is configured to execute various function applications and data processing of the mobile phone by running the software programs and the modules stored in the memory 620. The memory 620 can mainly include a program storage area and a data storage area. The program storage area can store an operating system, applications required for at least one function (such as a data backup function, a function of scanning two-dimensional code, and a function of determining compatibility), and so on. The data storage area can store data (such as the first data set and the second data set backed up) created according to use of the mobile phone, and so on. In addition, the memory 620 can include a high-speed RAM, and can further include a non-volatile memory such as at least one disk storage device, a flash device, or other non-volatile solid storage devices.

An input unit 630 is configured to receive input digital or character information and to generate key signal input associated with user setting and functional control of the mobile phone. In some possible implementations, the input unit 630 may include a touch panel 631 and other input devices 632. The touch panel 631, also referred to as a touch display screen, can be configured to receive a touch operation of the user on or near the touch panel 631 (such as an operation of the user on or near the touch panel 631 with fingers, stylus, or any other suitable objects or attachments) and drive a corresponding connection device based on a pre-set procedure. In some possible implementations, the touch panel 631 can include a touch detecting device and a touch controller. The touch detecting device can be configured to detect a touch position of the user, detect a signal generated by the touch operation, and send the signal to the touch controller. The touch controller is configured to receive touch information from the touch detecting device, convert the touch information into touch coordinate information and send the touch coordinate information to the processor 680, and receive and execute a command from the processor 680. In addition, the touch panel 631 can be of a resistance-type, capacitance-type, infrared ray-type, surface acoustic wave (SAW)-type, and other types. The input unit 630 can further include other input devices 632 in addition to the touch panel 631. Specifically, the other input devices 632 can include, but are not limited to, one or more of a physical keyboard, a functional key (such as a volume control key, a switch key, and so on), a track ball, a mouse, and an operating rod.

A display unit 640 is configured to display information input by the user, information provided for the user, or various menus of the mobile phone. The display unit 640 can include a display panel 641, and in some possible implementations, the display panel 641 may be configured in the form of a liquid crystal display (LCD), an organic light-emitting diode (OLED), and so on. In addition, the touch panel 631 can cover the display panel 641. After the touch panel 631 detects the touch operation on or near the touch panel 631 and sends the touch operation to the processor 680 to determine a type of a touch event, the processor 680 provides a corresponding visual output on the display panel 641 according to the type of the touch event. In FIG. 6, although the touch panel 631 and the display panel 641 are served as two independent components to realize input and output functions, the touch panel 731 may be integrated with the display panel 641 to realize the input and output functions in some possible implementations.

The mobile phone may also include at least one sensor 650, such as a light sensor, a motion sensor, and other sensors. As an implementation, the light sensor may include an ambient light sensor and a proximity sensor. The ambient light sensor can be configured to adjust the brightness of the display panel 641 according to ambient lights, and the proximity sensor can be configured to turn off the display panel 641 and/or backlight when the mobile phone reaches nearby the ear. As one kind of motion sensor, an accelerometer sensor can be configured to detect the magnitude of acceleration in different directions (typically three axes) and the accelerometer sensor can also be configured to detect the magnitude and direction of gravity when mobile phone is stationary. The accelerometer sensor can also be configured to identify mobile-phone gestures related applications (such as vertical and horizontal screen switch, related games, magnetometer attitude calibration), and can be used for vibration-recognition related functions (such as a pedometer, or percussion), and so on. The mobile phone can also be equipped with other sensors such as a gyroscope, a barometer, a hygrometer, a thermometer, an infrared sensor, etc., which will not be repeated herein.

An audio circuit 660, a speaker 661, and a microphone 662 can provide an audio interface between the user and the mobile phone. The audio circuit 660 can be configured to convert received audio data into electrical signals and transfer the electrical signals to the speaker 661; the speaker 661 is configured to convert the electrical signals received into sound signals for output. On the other hand, the microphone 662 is configured to convert the received sound signals into electrical signals, which will be received and then converted into audio data by the audio circuit 660. The audio data is then transmitted to the processor 680 to be processed. The audio data processed by the processor 680 is transmitted to another mobile phone via an RF circuit 610 for example or is output to the memory 620 for further processing.

Wi-Fi belongs to a short-range wireless transmission technology. With aid of a Wi-Fi module 670, the mobile phone may assist the user in E-mail receiving and sending, webpage browsing, access to streaming media, and the like. Wi-Fi provides users with wireless broadband Internet access. Although the Wi-Fi module 670 is illustrated in FIG. 6, it is to be noted that the Wi-Fi module 670 is not essential to the mobile phone and can be omitted according to actual needs without departing from the essential nature of the present disclosure.

The processor 680 is a control center of the mobile phone, and is configured to connect all parts of the whole mobile phone by utilizing various interfaces and lines, to run or execute the software programs and/or the modules stored in the memory 620, and to call data stored in the memory 620 to execute various functions and data processing of the mobile phone, so as to monitor the mobile phone as a whole. Optionally, in some implementations, the processor 680 can include one or more processing units. In some possible implementations, the processor 680 may be integrated with an application processor and a modulation-demodulation processor. The application processor is mainly configured to process an operating system, a user interface, an application program, and the like, and the modulation-demodulation processor is mainly configured to process wireless communication. It can be noted that the modulation-demodulation processor may not be integrated into the processor 680.

The mobile phone also includes a power supply 690 (e.g., a battery) that supplies power to various components. For instance, the power supply 690 may be logically connected to the processor 680 via a power management system to achieve management of charging, discharging, and power consumption through the power management system.

Although not illustrated, the mobile phone may include a camera, a Bluetooth® module, etc., and the present disclosure will not elaborate herein.

Figure 6:
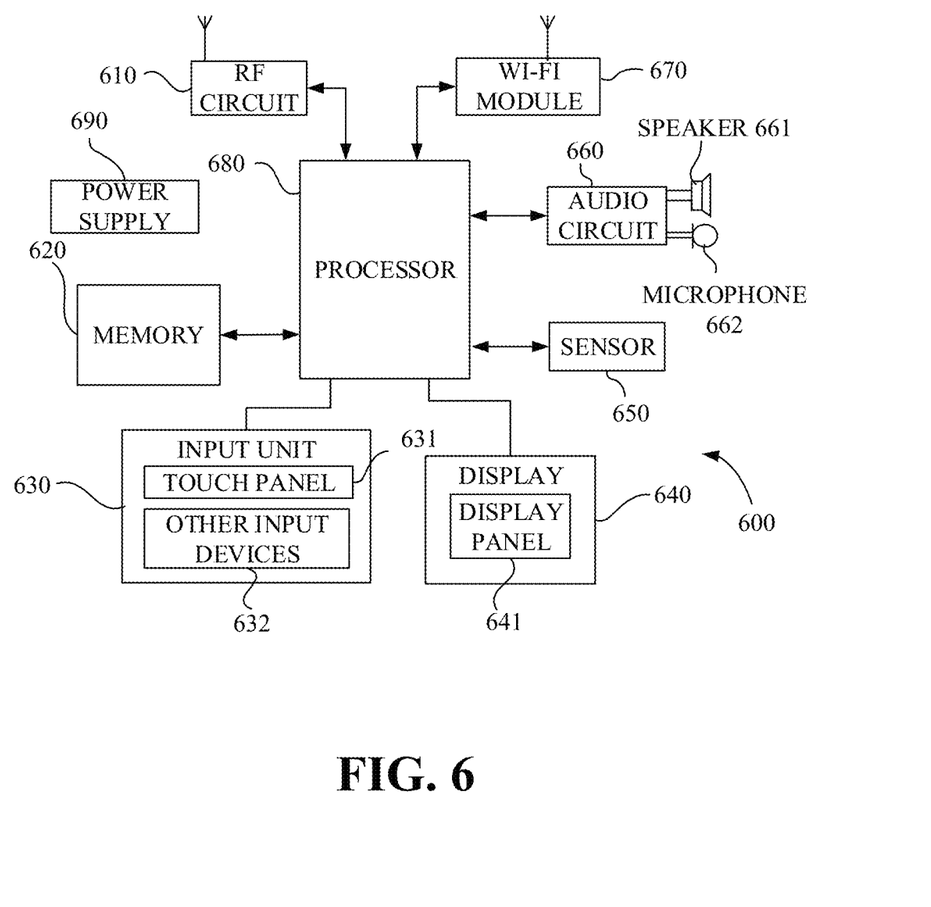
FIG. 6 is a block diagram illustrating a terminal according to an additional implementation of the present disclosure.

The methods of the foregoing implementations can be implemented based on the structure of the terminal illustrated in FIG. 6.

A non-transitory computer storage medium is also provided. The non-transitory computer storage medium is configured to store programs which, when executed, are operable to execute some or all of the steps of any of the methods for data migration as described in the above-described method implementations.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in an implementation, reference may be made to related descriptions in other implementations.

In the implementations of the present disclosure, it is to be noted that, the apparatus disclosed in implementations provided herein may be implemented in other manners. For example, the device/apparatus implementations described above are merely illustrative; for instance, the division of the unit is only a logical function division and there can be other manners of division during actual implementations; for example, multiple units or components may be combined or may be integrated into another system, or some features may be ignored, omitted, or not performed. In addition, coupling or communication connection between each illustrated or discussed component may be direct coupling or communication connection, may be indirect coupling or communication among devices or units via some interfaces, and may be electrical connection, mechanical connection, or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be noted by those of ordinary skill in the art that all or a part of the various methods of the implementations described above may be accomplished by means of a program to instruct associated hardware, where the program may be stored in a computer-readable memory, which may include a flash memory, a read-only memory (ROM), a random-access memory (RAM), a disk or a compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for data migration, comprising:
    obtaining, by a first terminal, attribute information of a second terminal by scanning a two-dimensional code of the second terminal;
    determining, by the first terminal, a first application compatible with the second terminal according to the attribute information of the second terminal;
    obtaining, by the first terminal, a first data set by performing data backup on the first application; and
    transmitting, by the first terminal, the first data set to the second terminal,
    wherein performing the data backup on the first application comprises:
        dividing, by the first terminal, N first applications into M application sets, and performing data backup on all first applications in an application set J in parallel when N is greater than or equal to W, wherein the application set J is one of the M application sets, and N, W, and M are integers greater than one;
        performing, by the first terminal, data backup on all first applications in an application set K in parallel until data backup of the M application sets is completed after backup of the application set J is completed, wherein the application set K is one of the M application sets other than the application set J; and
        performing, by the first terminal, data backup on the N first applications in parallel when N is less than W.

2. The method of claim 1, wherein the attribute information comprises at least one of model, version information, system version information, and supported-interface information.

3. The method of claim 1, further comprising:
    prompting, by the first terminal, a message for indicating that data of a second application has not been migrated after transmitting the first data set to the second terminal.

4. The method of claim 3, wherein the message comprises at least one of voice prompt, text prompt, and vibration prompt.

5. The method of claim 3, wherein the first application is a third-party application installed in the first terminal or a system application, and the second application is a third-party application installed in the first terminal or a system application.

6. The method of claim 1, further comprising:
    performing, by the first terminal, data backup on a second application incompatible with the second terminal to obtain a second data set; and
    transmitting, by the first terminal, the second data set of the second application to a network server, after data backup of the second application is completed.

7. The method of claim 1, wherein a relationship between the application set J and the application set K comprises at least one of:
    a data size of the application set J is less than that of the application set K;
    a usage frequency of each first application contained in the application set J is higher than that of each first application contained in the application set K; and
    the number of first applications contained in the application set J is smaller than the number of first applications contained in the application set K.

8. The method of claim 1, wherein performing, by the first terminal, the data backup on the first application comprises:
performing, by the first terminal, data backup on arbitrary w first applications among N first applications in parallel when N is greater than or equal to w, wherein N and w is an integer greater than one;
performing, by the first terminal, data backup on a first application K in a thread for backup of a first application j until data backup of the N first applications is completed after data backup of the first application j is completed, wherein the first application j is one of the w first applications, and the first application k is one of the N first applications other than the w first applications; and
performing, by the first terminal, data backup on the N first applications in parallel when N is less than w.

9. A terminal, comprising:
at least one processor; and
a computer readable storage, coupled to the at least one processor and storing at least one computer executable instruction thereon which, when executed by the at least one processor, cause the at least one processor to carry out actions, comprising:
obtaining attribute information of a second terminal by scanning a two-dimensional code of the second terminal;
determining a first application compatible with the second terminal according to the attribute information of the second terminal; and
obtaining a first data set by performing data backup on the first application and transmitting the first data set to the second terminal,
wherein performing the data backup on the first application comprises:
dividing N first applications into M application sets, and performing data backup on all first applications in an application set J in parallel, when N is greater than or equal to W, wherein the application set J is one of the M application sets, and N, W, and M are integers greater than one;
performing data backup on all first applications in an application set K in parallel until data backup of the M application sets is completed, after backup of the application set J is completed, wherein the application set K is one of the M application sets other than the application set J; and
performing data backup on the N first applications in parallel, when N is less than W.

10. The terminal of claim 9, wherein the attribute information comprises at least one of model, version information, system version information, and supported-interface information.

11. The terminal of claim 9, wherein the at least one computer executable instruction, when executed by the at least one processor, further causes the at least one processor to carry out actions, comprising:
prompting a message for indicating that data of a second application has not been migrated after transmitting the first data set to the second terminal.

12. The terminal of claim 11, wherein the message comprises at least one of voice prompt, text prompt, and vibration prompt.

13. The terminal of claim 9, wherein the at least one computer executable instruction, when executed by the at least one processor, further causes the at least one processor to carry out actions, comprising:
performing data backup on a second application incompatible with the second terminal to obtain a second data set; and
transmitting the second data set of the second application to a network server, after data backup of the second application is completed.

14. The terminal of claim 9, wherein a relationship between the application set J and the application set K comprises at least one of:
a data size of the application set J is less than that of the application set K;
a usage frequency of each first application contained in the application set J is higher than that of each first application contained in the application set K; and
the number of first applications contained in the application set J is smaller than the number of first applications contained in the application set K.

15. The terminal of claim 9, wherein the at least one processor carrying out the action of performing data backup on the first application is caused to carry out actions, comprising:
performing data backup on arbitrary w first applications among N first applications in parallel, when N is greater than or equal to w, wherein N and w is an integer greater than one;
performing data backup on a first application K in a thread for backup of a first application j until data backup of the N first applications is completed, after data backup of the first application j is completed, wherein the first application j is one of the w first applications, and the first application k is one of the N first applications other than the w first applications; and
performing data backup on the N first applications in parallel, when N is less than w.

16. The terminal of claim 9, wherein the first application is a third-party application installed in the first terminal or a system application, and the second application is a third-party application installed in the first terminal or a system application.

17. A non-transitory computer storage medium storing a computer program which, when executed by a processor, causes the processor to carry out actions, comprising:
obtaining attribute information of a second terminal by scanning a two-dimensional code of the second terminal;
determining a first application compatible with the second terminal according to the attribute information of the second terminal; and
obtaining a first data set by performing data backup on the first application and transmitting the first data set to the second terminal,
wherein performing the data backup on the first application comprises:
dividing N first applications into M application sets, and performing data backup on all first applications in an application set J in parallel when N is greater than or equal to W, wherein the application set J is one of the M application sets, and N, W, and M are integers greater than one;
performing data backup on all first applications in an application set K in parallel until data backup of the M application sets is completed after backup of the application set J is completed, wherein the application set K is one of the M application sets other than the application set J; and
performing data backup on the N first applications in parallel, when N is less than W.

18. The non-transitory computer storage medium of claim 17, the computer program is further executed by the processor to carry out actions, comprising:
- performing data backup on a second application incompatible with the second terminal to obtain a second data set; and
- transmitting the second data set of the second application to a network server, after data backup of the second application is completed.

* * * * *